(12) United States Patent
Gross et al.

(10) Patent No.: US 11,714,744 B2
(45) Date of Patent: Aug. 1, 2023

(54) SYSTEM AND METHOD FOR DIAGNOSING A COMPUTING DEVICE IN SAFE MODE

(71) Applicant: ESW Holdings, Inc., Austin, TX (US)

(72) Inventors: Amit Gross, Kfar-Saba (IL); Daniel Shachrur, Sde-Varburg (IL)

(73) Assignee: ESW Holdings, Inc., Austin, TX (US)

( * ) Notice: Subject to any disclaimer, the term of this patent is extended or adjusted under 35 U.S.C. 154(b) by 0 days.

(21) Appl. No.: 15/555,504

(22) PCT Filed: Mar. 2, 2016

(86) PCT No.: PCT/IL2016/050236
§ 371 (c)(1),
(2) Date: Sep. 3, 2017

(87) PCT Pub. No.: WO2016/139665
PCT Pub. Date: Sep. 9, 2016

(65) Prior Publication Data
US 2019/0004935 A1    Jan. 3, 2019

Related U.S. Application Data

(60) Provisional application No. 62/126,728, filed on Mar. 2, 2015.

(51) Int. Cl.
*G06F 11/00* (2006.01)
*G06F 11/36* (2006.01)
*G06F 21/55* (2013.01)

(52) U.S. Cl.
CPC ...... *G06F 11/3688* (2013.01); *G06F 11/3676* (2013.01); *G06F 21/554* (2013.01); *G06F 2221/2105* (2013.01); *G06F 2221/2115* (2013.01)

(58) Field of Classification Search
CPC .................................................. G06F 11/3688
See application file for complete search history.

(56) References Cited

U.S. PATENT DOCUMENTS

| | | | | |
|---|---|---|---|---|
| 5,627,964 A | * | 5/1997 | Reynolds | G06F 11/1417 714/46 |
| 6,560,726 B1 | * | 5/2003 | Vrhel, Jr. | G06F 11/0757 713/2 |
| 6,675,295 B1 | * | 1/2004 | Marcelais | G06F 11/1441 713/1 |

(Continued)

OTHER PUBLICATIONS

International Search Report of Application No. PCT/IL2016/050236 dated Jun. 23, 2016.

*Primary Examiner* — Amine Riad

(57) ABSTRACT

A system and method may cause a computing device to operate according to a selected operational mode. A diagnostic application may selectively execute one or more tests on the computing device; record a result of executing a test; and perform an action based on the result. An operational mode selected may be a safe mode that includes executing only a portion of an operating system and the diagnostic application. A test may include executing an application and selectively validating performance of one or more resources of a computing device while the application is executing. A test may include executing an application selected based on a rule related to a category of applications.

19 Claims, 7 Drawing Sheets

(56) References Cited

U.S. PATENT DOCUMENTS

| | | | | |
|---|---|---|---|---|
| 7,136,729 B2* | 11/2006 | Salman | ................... | B60T 8/885 |
| | | | | 701/32.9 |
| 8,266,692 B2* | 9/2012 | Wenzinger | ................ | G06F 8/60 |
| | | | | 713/2 |
| 8,773,271 B1* | 7/2014 | Stevens | ................... | H03K 17/94 |
| | | | | 340/604 |
| 8,792,879 B2* | 7/2014 | Finberg | ............... | G06F 11/0748 |
| | | | | 455/425 |
| 9,632,139 B2* | 4/2017 | Chillie | ...................... | H04L 1/00 |
| 2009/0013409 A1* | 1/2009 | Wenzinger | ................ | G06F 8/60 |
| | | | | 726/24 |
| 2009/0077664 A1 | 3/2009 | Hsu et al. | | |
| 2009/0089616 A1 | 4/2009 | Chen et al. | | |
| 2009/0249121 A1* | 10/2009 | Kube | ................... | G06F 11/263 |
| | | | | 714/32 |
| 2012/0331552 A1 | 12/2012 | Wenzinger et al. | | |
| 2014/0337997 A1* | 11/2014 | Beck | ....................... | G06F 21/60 |
| | | | | 726/27 |
| 2016/0364308 A1* | 12/2016 | Shanbhogue | ....... | G06F 11/2635 |
| 2017/0132120 A1* | 5/2017 | Salameh | ................ | H04W 4/70 |

* cited by examiner

SYSTEM AND METHOD FOR DIAGNOSING A COMPUTING DEVICE IN SAFE MODE

CROSS-REFERENCE TO RELATED APPLICATIONS

This application is a National Phase Application of PCT International Application No. PCT/IL2016/050236, International Filing Date Mar. 2, 2016, claiming the benefit of U.S. Patent Application No. 62/126,728, filed Mar. 2, 2015, all of which are hereby incorporated by reference.

FIELD OF THE INVENTION

The present invention relates generally to diagnosing a computing device. More particularly, the present invention relates to a system and method for diagnosing a computing device using a special operational mode.

BACKGROUND $3^{rd}$ party applications and $3^{rd}$ services are known in the art. Generally, $3^{rd}$ party applications and services are any applications or services installed in a computing device after, or on top of, an operating system or code provided with a computing device. Known methods for diagnosing a computing device that fails to operate properly typically involve using an application programming interface (API) or other application or code that check specific components or applications in the tested device. For example, a process of testing a mobile computing device (e.g., a smartphone) may include attempting to establish an outgoing call in order to verify that the device can establish an outgoing call, take a picture to validate that the camera is working properly and so on.

Many of the failures related to mobile devices stem from $3^{rd}$ party application. One of the reasons may be an incompatibility of a $3^{rd}$ party application with the computing device. Another reason may be malicious code or bugs in $3^{rd}$ party applications that can cause functions of the device to fail.

For example, a $3^{rd}$ party application can cause an outgoing call to fail by intercepting an outgoing phone call attempt, e.g., by blocking or intercepting the phone application or the OS in a smartphone before a call is established. A $3^{rd}$ party application can end a call as soon as it is established, or it may interfere with calls by changing a setting of the device (e.g., set a device to auto reject all outgoing or incoming calls). A $3^{rd}$ party application can disable components such as a WiFi unit or global positioning system (GPS) unit, or a 3rd party application can disable or block the camera in specific scenarios, e.g., maliciously or as a feature.

Safe mode is known in the art. Generally, safe mode is an operational mode of a computing device whereby only predefined or specific units or applications are active or operating. For example, safe mode may be an operational mode in which only the operating system is running and no 3rd party application or other programs or applications are running or executed.

Some vendors enable users to enter safe mode manually, e.g., by pressing on a specific hard-key combination (e.g., volume down, menu key or home key) while the device is restarting (usually in a specific point during the restart). This functionality is different between device manufacturers and device models. Since the safe mode restart option is hidden and the key combination to get into safe mode is not trivial, a lot of users are not familiar with this functionality and/or can't perform the required steps due to the complexity of the process. Furthermore, not all technicians are familiar with this option.

SUMMARY OF THE INVENTION

In some embodiments, a diagnostic application installed in a computing device may cause the computing device to operate according to a selected operational mode. A diagnostic application may selectively execute one or more tests on the computing device; record a result of executing a test; and perform an action based on the result.

An operational mode may be a safe mode that includes only executing a portion of an operating system and the diagnostic application. A diagnostic application may verify that, other than the diagnostic application, the only code executed on the computing device is code of an operating system. A diagnostic application may record results of tests executed under normal mode and may select to execute tests under safe mode based on the recorded results.

A diagnostic application may selectively execute an application and identify a problem caused by the application. A test performed by a diagnostic application may include executing an application and selectively validating performance of one or more resources of a computing device while the application is executing and after the application has terminated. A diagnostic application may be stored in a memory of a computing device by one of: a manufacturer of the computing device and downloading by an operator.

A test may include executing an application selected based on a rule related to a category of applications. A test may include executing an application selected based on a set of applications for which execution failed under normal mode. A diagnostic application may iteratively and selectively execute one application from a set of applications; record a result of executing the application; and perform an action based on the result. An external computing unit may be configured to cause a computing device to operate in a selected operational mode. An external computing unit may be one of: a remote server and a directly connected computer. An external computing unit may cause a computing device to restart into a selected operational mode and the external computing unit may cause a diagnostic application installed in the computing device to: selectively execute one or more tests, record a result of executing a test, and perform an action based on the result.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
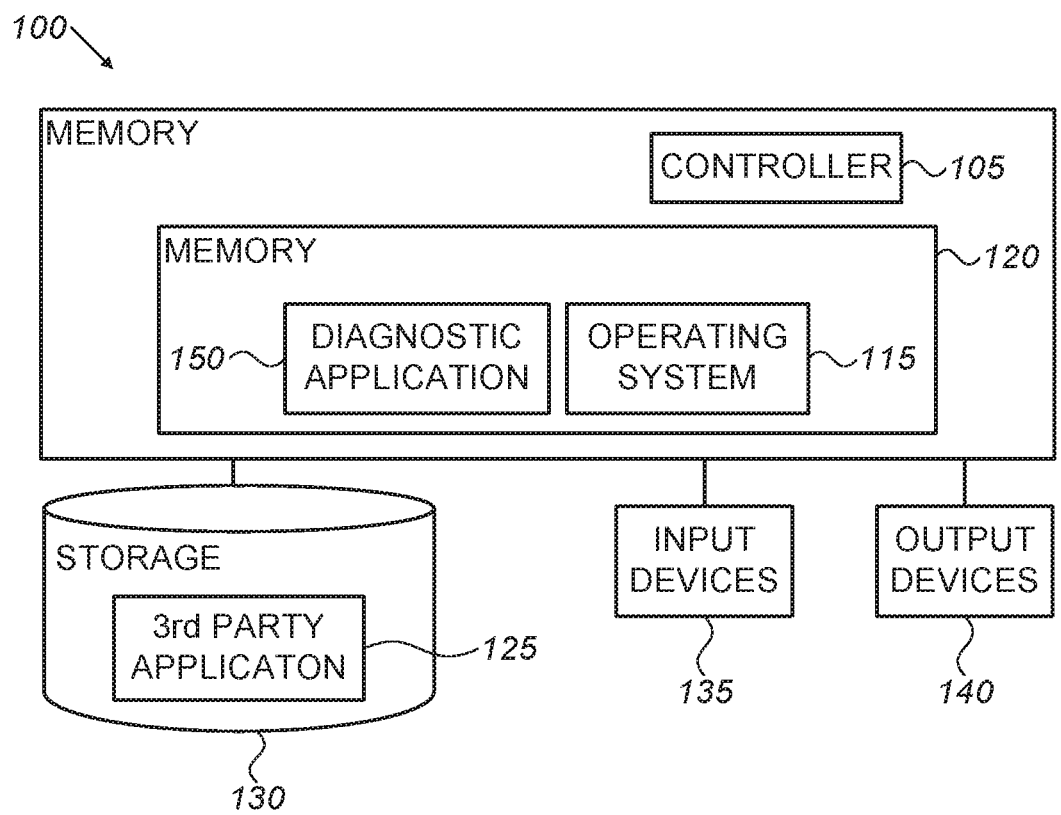
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently. In addition, one or more of the method elements may not be required in order to perform some method embodiments according to the present invention.

A system and method according to embodiments of the invention may include automatically setting an operational mode of a computing device to safe mode. A system and method according to embodiments of the invention may include automatically configuring a computing device to an operational state that includes only executing a predefined set of applications. For example, a system and method according to embodiments of the invention may cause a computing device to only execute an operating system and avoid executing any $3^{rd}$ party or other applications or programs.

As described, after entering safe mode, $3^{rd}$ party or other programs may be selectively invoked or executed such that the effect of each $3^{rd}$ party application on the computing device may be determined or identified. For example, a system and method according to embodiments of the invention may invoke, run or execute $3^{rd}$ party applications selectively or individually (e.g., only run one $3^{rd}$ party application at a time) to try and determine which application is causing an issue, problem or malfunction. A system and method according to embodiments of the invention may determine if there is a hardware issue, e.g., by isolating operation of a $3^{rd}$ party application and thus determining effects of the isolated $3^{rd}$ party application on an operation of the computing device. As described, a system and method according to embodiments of the invention may identify $3^{rd}$ party applications that cause issues on the device and offer a solution, e.g., disable or uninstall $3^{rd}$ party applications. As described, a system and method according to embodiments of the invention may identify issues or problems related to $3^{rd}$ party applications and perform an action based on the issues or problems, e.g., disable or uninstall $3^{rd}$ party applications.

Reference is made to FIG. 1, showing a high level block diagram of an exemplary computing device according to embodiments of the present invention. Computing device 100 may include a controller 105 that may be, for example, a central processing unit processor (CPU), a chip or any suitable computing or computational device, an operating system 115, a memory 120, a storage system or component 130, input devices 135 and output devices 140. Controller 105 may be configured to carry out methods described herein, and/or to execute or act as the various modules, units, etc., for example by executing code or software. More than one computing device 100 may be included, and one or more computing devices 100 may act as the various components of a system according to embodiments of the invention.

As shown, storage 130 may include or store a $3^{rd}$ party application 125. For example, $3^{rd}$ party application 125 may be downloaded to computing device 100 from a server on the internet and may be stored on storage 130. $3^{rd}$ party application 125 may be loaded from storage 130 into memory 120 and may be executed by controller 105. Although, for the sake of clarity and simplicity, only one $3^{rd}$ party application 125 is shown in FIG. 1, it will be understood that any number of $3^{rd}$ party applications may be stored on storage 130, loaded into memory 120 and/or be executed by controller 105.

As shown, a diagnostic application 150 (further described herein) may be loaded into memory 120 and may be executed by controller 105. By executing diagnostic application 150, controller 105 may be configured to carry out a method of diagnosing a computing device as described herein.

Operating system 115 may be or may include any code segment designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Diagnostic application 150 may be any suitable executable code, e.g., an application, a program, a process, task or script. Diagnostic application 150 may be executed by controller 105 possibly under control of operating system 115. For example, diagnostic application 150 may be an application that causes computing device 100 to run or operate in safe mode and further diagnose computing device 100 in safe mode as further described herein.

Storage 130 may be or may include, for example, a flash disk, a memory chip, a universal serial bus (USB) device or other suitable removable and/or fixed storage unit. Content may be stored in storage 130 and may be loaded from storage 130 into memory 120 where it may be processed or executed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a touch screen or pad or any suitable input device (e.g., a mouse or a keyboard connected via USB or other interfaces). It will be recognized that any suitable number of input devices may be operatively connected to computing device 100 as shown by block 135. Output devices 140 may include one or more displays or monitors, a touch screen, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface component, a printer, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory or a USB flash memory, encoding, including or storing instructions, e.g., computer-executable instructions, which, when executed by a processor or controller, carry out methods disclosed herein. For example, an article may include a storage medium such as memory 120, computer-executable instructions such as diagnostic application 150 and a controller such as controller 105.

A storage medium included in a system according to embodiments if the invention may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system according to embodiments of the invention may additionally include other suitable hardware components and/or software components. In some embodiments, a system may include or may be, for example, a smartphone and a server computer or any other suitable computing device. For example, a system according to embodiments of the invention may include a smartphone that may include components similar to those included in computing device 100 and a server computer for downloading diagnostic application 150 to the smartphone.

In an embodiment, computing device 100 is a smartphone or mobile device. For example, computing device 100 may be a mobile phone, a smartphone, a tablet or a cellular phone and operating system 115 may be any of the Android or iOS operating systems or versions known in the art. Although smart phones are mainly referred to herein it will be understood that embodiments of the invention may be applicable to other devices. For example, embodiments of the invention may cause a laptop or computer to run in safe mode and may diagnose the laptop or computer when running in safe mode as described herein.

Figure 2:
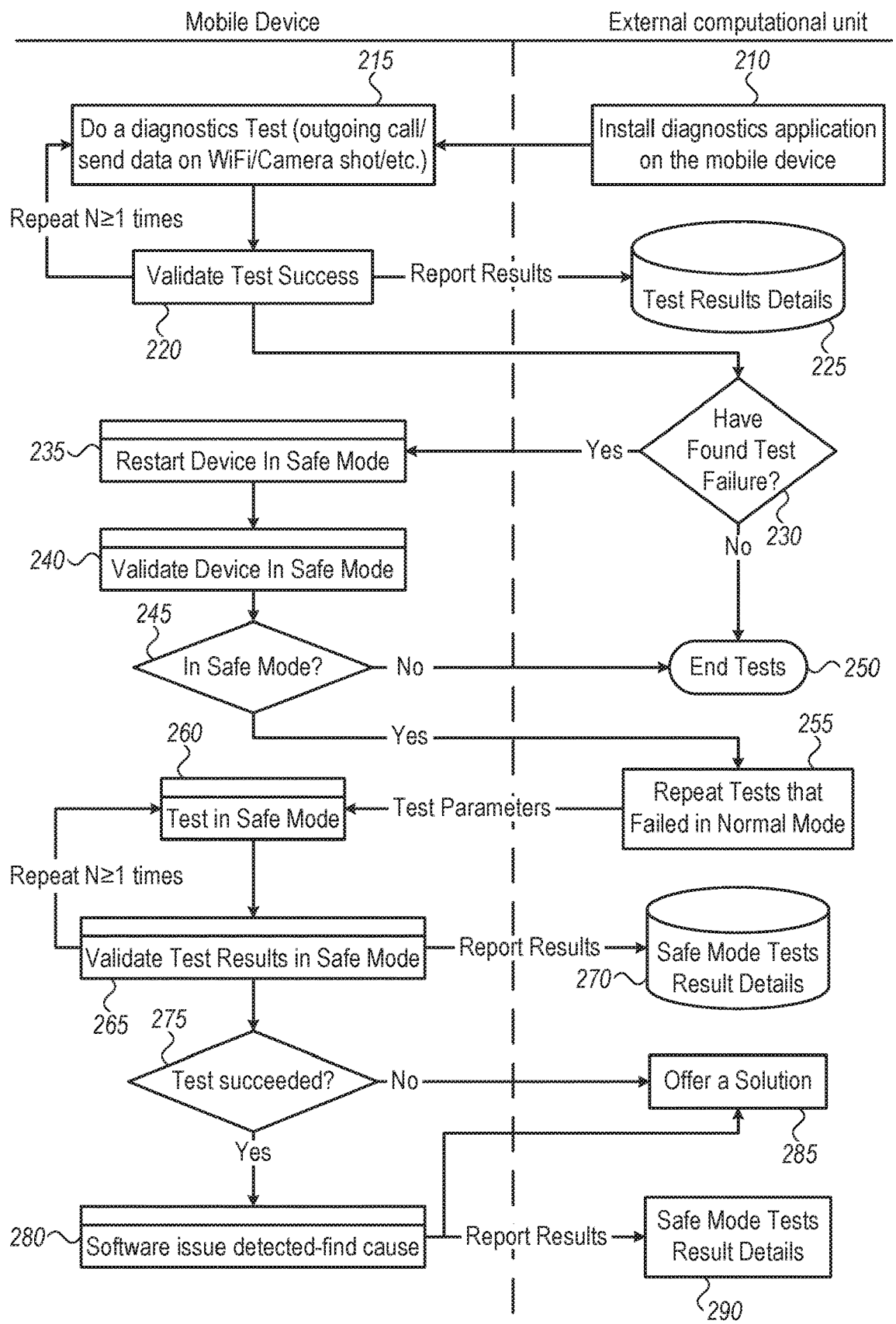
FIG. 2 shows a flowcharts of a method for diagnosing a computing device according to some embodiment of the present invention.

Reference is made to FIG. 2, a flowchart of a method according to an embodiment of the present invention. As shown, an external computing device may be connected to a tested device. For example, the external computing device may be a server or other computer that may be connected to a tested device (that may be a mobile device) via any suitable network or wiring, e.g., via a cellular network, a USB cable or a BlueTooth or WiFi connection. As shown by block 210, a diagnostic application may be installed on the tested mobile device. For example, a server may use a network or a USB connection to install diagnostic application 150 in a memory 120 of a mobile device.

As shown by block 215, diagnostic application 150 may run diagnostic tests (e.g., test outgoing calls, send data on a WiFi connection, attempt to take a picture using a built in camera, extract or read a log file, parse it and analyze the data instantly or by a remote service etc.). For example, diagnostic application 150 may verify or determine the tested device is running in normal mode (and not safe mode) and may then run a set of tests. As shown by block 220 and the arrow connecting blocks 220 and 215, diagnostic tests may be performed or executed any number of times and diagnostic application 150 may determine whether or not the tests succeeded.

For example, diagnostic application 150 may interact with built in components or hardware units of a mobile device (e.g., using APIs) or diagnostic application 150 may interact with an operating system 115 on the mobile device in order to perform tests and determine success or failure of tested components and functions of the tested device.

As shown by block 225, test results may be communicated back to the external computing device and may be stored thereon. For example, for each test a result may be recorded such that recorded test results may be used to identify components or functionalities of the tested device that failed. It is noted that results for tests executed in normal (or non-safe mode) may be stored and, possibly separately, results for tests executed in safe mode may be stored as shown by block 225. Accordingly, an embodiment may readily compare results of tests executed in safe and non-safe modes. Recorded or stored results for tests (in normal and non-normal modes) may include a list of the tests and a "fail" and "success" indication such that selecting to execute only tests that failed or succeeded may be performed.

As shown by block 230, a flow may include determining whether or not at least one test failed (or all tests have passed or succeeded), as shown by block 250, if none of the tests failed and/or all tests were successfully executed, a flow may terminate. As shown by block 235, if one or more tests failed, then the tested device may be set to operate in safe mode, for example, diagnostic application 150 may restart the tested device into safe mode as known in the art.

As shown by block 240, an embodiment may be determine or verify that the tested device is indeed running or operating in safe mode. For example, diagnostic application 150 may verify that other than operating system 115, no other application or program is running or active on a tested computing device, e.g., diagnostic application 150 may verify that, other than code in diagnostic application 150, the only code executed on the computing device is code of an operating system.

As shown by block 245, and embodiment may determine whether or not a computing device is operating in a predefined operational mode and, as shown by block 250, if the tested device is not running in safe mode then a system according to embodiments of the invention may determine that the device cannot be operated in safe mode and the flow may terminate.

Termination of a flow as shown by block 250 may include presenting a message on a screen of the computing device. A message displayed (or sent to a server) may be based on results of tests, e.g., if no problems were found, a message sent to an external computer (e.g., a server on a network) may be "No problems found" and, if problems or issues are identified (e.g., at least one of tests failed), the message may be "Application [Application name] was disabled".

It should be appreciated that, according to some embodiments, the tested device may be set to operate in safe mode before any test is initiated and all or some of the tests may be initiated in safe mode.

As shown by block 255, if it is verified that the device is running in safe mode then tests that failed when running in normal mode may be repeated in safe mode as shown by block 260. For example, results of tests performed in normal operational mode may be recorded as described (e.g., with reference to block 225), accordingly, an embodiment may select to execute, in safe mode, only tests that failed during normal mode, e.g., by examining a list of tests performed in normal mode and their results, and selecting to execute only tests that failed in normal mode.

As shown by block 270, results of tests executed in safe mode may be sent to an external computer and may be recorded thereon. As shown by block 265 and the arrow connecting blocks 265 and 260, tests under safe mode may be run or performed and validated any number of times, e.g., in order to validate success or failure of tests. For example, if a test succeeds once it may be performed a second time in order to ensure the test always succeeds. Similarly, if a test fails, it may be executed again in order to verify that the failure is consistent and not an accidental or one-time failure. Recording results (e.g., as shown by block 270) may include recording the number of times a test was performed and results of each execution or instance of the test.

As shown by block 275, an embodiment may determine whether or not all tests were successful and, as shown by block 285, if one or more of the tests performed under safe mode failed, then a solution may be offered. For example, failure of a test in safe mode may indicate hardware failure or malfunction or failure of a test in safe mode may indicate, or be related to, wrong settings. For example, a system and method according to embodiments of the invention may suggest resetting the tested device to its factory default settings, upgrade firmware, flash or replace a recently installed firmware etc. A server may include, or be connected to, a database that includes a list or other object that includes, for each of a plurality of $3^{rd}$ party or other applications, the name or other identification of the application, possible problems or issues known to be caused by the application and one or more solutions for the known problems. Accordingly, after identifying a specific $3^{rd}$ party or other application causes issues (by running tests as described), an embodiment may suggest a solution based on data in a database as described.

A cause, issue or problem, related to an application may be detected or identified. As shown by block 280, if tests that failed under a normal mode of operation succeed or pass when the tested device runs in safe mode then a system and method according to embodiments of the invention may determine that failure of tests in normal mode is due to $3^{rd}$ party applications that may interfere with the device's operation.

For example, when the tested device is running in safe mode, $3^{rd}$ party applications may be selectively, or one by one, loaded into memory 120 and executed or allowed to run and a test that failed may be performed again. Accordingly, by selectively (and iteratively) running one $3^{rd}$ application at a time and running a test that failed, the cause of the failure or the $3^{rd}$ application that causes the failure may be identified or determined. As shown by block 290, results of running tests with selected $3^{rd}$ applications running may be recorded. As further shown, a solution may be offered. For example, having identified a $3^{rd}$ party application or service that causes a test to fail, a system and method according to embodiments of the invention may suggest to uninstall the $3^{rd}$ party application, change setting of the computing device, or clear a cache of an application. Other suggestions or solutions as described herein may be provided, e.g., based on information in a database as described herein.

In some embodiments, a flow as shown in FIG. 2 and described herein may be performed using a remote server or a directly connected computer that may send commands to a tested mobile device using a network connection (e.g., a remote server using a mobile data network) or using a wired connection (e.g., a directly connected computer using a USB connection). In such case, the diagnostic application (e.g., diagnostic application 150) installed on the tested mobile device may have a privileges required to enter the tested device into safe mode (e.g., by jailbreaking, rooting or otherwise unlocking the operating system so modification, configuration or customization of the device is possible as known in the art). In some embodiments, a privileged diagnostic application is a preinstalled application used by the mobile network operator or preinstalled by the manufacturer of the tested device.

Figure 3:
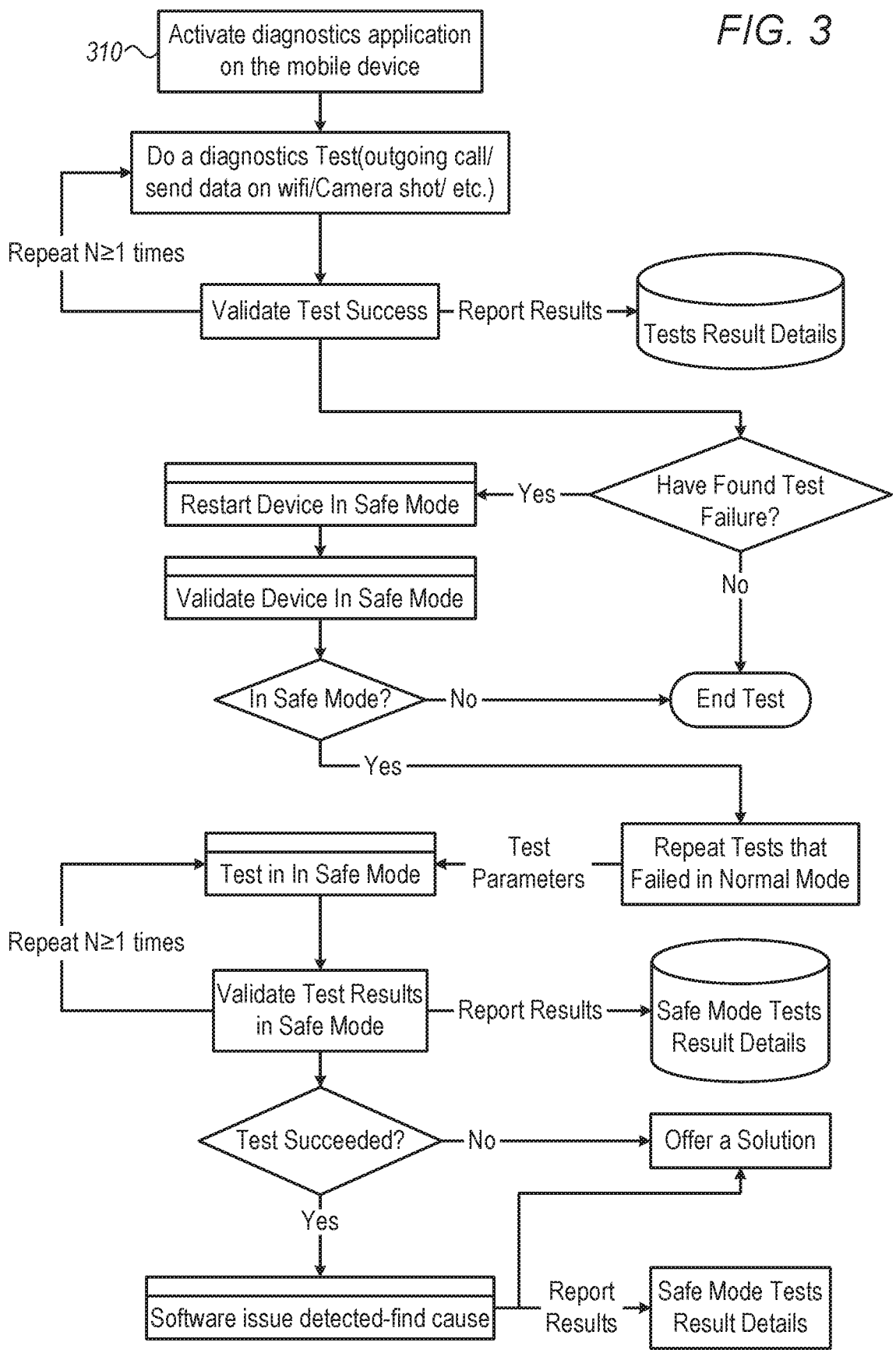
FIG. 3 shows a flowcharts of a method for diagnosing a computing device according to some embodiment of the present invention.

Reference is made to FIG. 3 that shows a flowchart of a method according to an embodiment of the present invention. As shown by block 310, a diagnostic application may be activated on a tested device. For example, diagnostic application 150 may be installed by a mobile network operator (e.g., downloaded to a smartphone as known in the art) or it may be preinstalled by the manufacturer of a tested computing device, e.g., computing device 100 may be a smartphone and diagnostic application 150 may be installed in the smartphone by the manufacturer of the smartphone. As shown, a flow similar to the flow described with respect to FIG. 2 may be performed using an application installed (or pre-installed) in the tested device as described.

Figure 4:
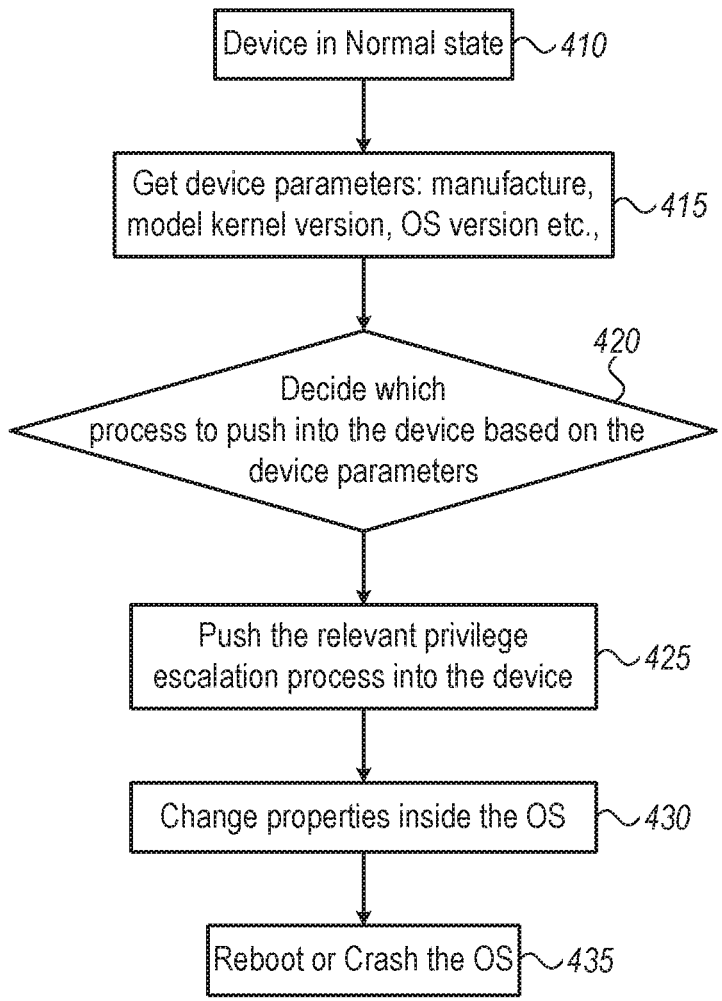
FIG. 4 shows a flowcharts of a method for diagnosing a computing device according to some embodiment of the present invention.

Reference is made to FIG. 4, a flowchart of a method according to an embodiment of the present invention. As shown by block 410, a tested device may be set, configured, or caused to run or operate in a normal operational mode. As shown by block 415, parameters related to the device, e.g., manufacturer information and identification, model and kernel versions, operating system type and version and the like may be obtained. Device parameters that are identified, collected and recorded as shown by block 415 may include any information related to applications installed on the device, e.g., which $3^{rd}$ party application are installed. Device parameters that are identified, collected and recorded as shown by block 415 may include any settings or configurations of the device, e.g., diagnostic application 150 may record whether or not the network is enabled, the sound is muted and the like. By recording a state or configuration of a tested device prior to testing it, embodiments of the invention may identify changes made by application, e.g., knowing the sound was enabled (not muted) before a test and detecting the sound is muted after testing a selected $3^{rd}$ party application, an embodiment may determine the tested $3^{rd}$ party application tampers with the device's sound settings.

For example, diagnostic application 150 may interact with operating system 115 on a tested device and may obtain various parameters or attributes of the tested device. As shown, based on parameters of the tested device, a special application to be installed in the device may be selected. For example, specific applications capable of modifying an operating system of specific device may be stored in a server and, once the type and other attributes of a tested device are known, identified or determined, the specific application suitable for causing the device to enter safe mode may be selected, downloaded to the device and executed as described herein.

For example, a first application may be specifically tailored to cause an Android device to enter safe mode and a second application may be specifically tailored to cause an iOS device to enter safe mode. As shown by block 425, once required information related to the tested device is obtained, a selected process or application may be pushed to, or installed in, the tested device. As shown by block 430, a process installed in the tested device may change any property of an operating system in the tested device. For example, diagnostic application 150 may modify operating system 115 such that in a subsequent reboot of computing device 100, computing device 100 will enter safe mode. As shown by block 435, after modifying the operating system or other operational aspects of the device, the pushed application may cause the tested device to reboot, e.g., by causing the operating system in the device to crash as known in the art. For example, diagnostic application 150 may terminate (or kill as referred to in the art) a specific operating system process and thus cause the tested device to reboot.

A system and method according to embodiments of the invention may validate a tested device is running in safe mode. For example, after entering a device into safe mode as described herein, a system and method according to embodiments of the invention may validate the tested device is indeed operating in safe mode. For example, a system and method according to embodiments of the invention may check to see if any $3^{rd}$ party application is running on the tested device and, if a $3^{rd}$ party application is running then it may be determined that the device is not operating in safe mode. If no $3^{rd}$ party application is running and/or if it is determined that an operating system is the only process running on the device then it may be determined that the tested device is indeed running or operating in safe mode. A system and method according to embodiments of the invention may check or examine system properties or environment variables as known in the art in order to determine the operational mode of a tested device and/or verify the device is running in safe mode. A system and method according to embodiments of the invention may examine a log file maintained by an operating system in order to determine a device is running in safe mode.

Figure 5:
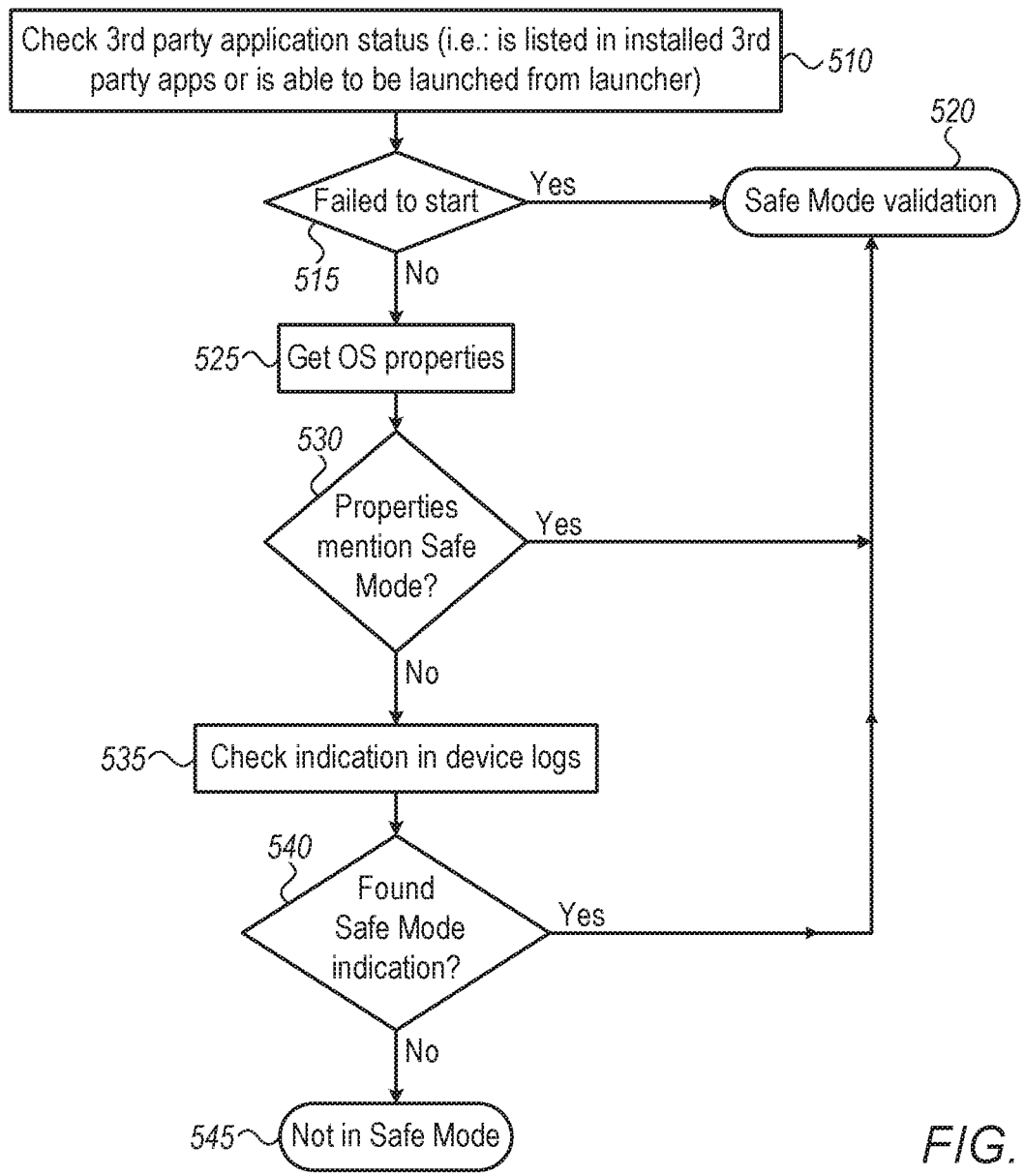
FIG. 5 shows a flowcharts of a method for diagnosing a computing device according to some embodiment of the present invention.

Reference is made to FIG. 5, a flowchart of a method according to an embodiment of the present invention. As shown by block 510, a $3^{rd}$ party application's status, state or configuration may be checked, identified or determined. For example, if an installed $3^{rd}$ party application or process stopped running on a device then it may be determined that the device is in safe mode (since in safe mode, $3^{rd}$ party applications are expected to stop running).

For example, to verify a device is indeed running in safe mode, diagnostic application 150 may check whether all or some previously running $3^{rd}$ party applications have ceased running and, if so, then diagnostic application 150 may determine that computing device 100 is running in safe mode. If, however, previously running $3^{rd}$ party applications continue to run after an attempt to enter safe mode has been conducted, then diagnostic application 150 may determine that computing device 100 is not running in safe mode.

As shown by block 515, an embodiment may determine whether or not a device has entered safe mode (e.g., restarted or rebooted into safe mode as known in the art). For example, failure to stop all running $3^{rd}$ party applications when attempting to enter safe mode may be used as indication that a computing device has failed to enter safe mode. It should be appreciated that the above example is not always applicable, as there may be privileged applications/processes that may continue running even in safe mode. Accordingly, to validate or confirm that a device is indeed in safe mode, diagnostic application 150 may verify that only a set of known or predefined applications are executed on the device.

As shown by block 520, an embodiment may validate safe mode operation, e.g., determine or ascertain that a tested device is operating in safe mode. Verifying safe mode is achieved may be done on various was. For example, in order to verify safe mode, diagnostic application 150 may check a list of installed applications on computing device 100 and verify that none, or only a selected set, of the installed applications is executed. In some embodiments, when computing device 100 is in safe mode, the list of executing applications should not include any 3rd party application. If however, the list of executing applications includes a 3rd party application, then diagnostic application 150 may determine that computing device 100 is not in safe mode.

As shown by block 525, properties of an operating system may be examined and, based on the properties, it may be determined whether or not a tested device is running in safe mode. According to some embodiments, the properties (also referred to as environment variables) may be variables in the operating system or in a specific process such as a main process in the OS e.g. "system_server") that are set after rebooting into safe mode. An exemplary parameter may be: persist.sys.safemode. Checking fields in specific class during runtime such as: Zygote.systemInSafeMode can also indicate to diagnostic application 150 that the device is in safe mode.

Accordingly and as shown by block 530, a system and method may verify safe mode operation based on properties or state of an operating system. As shown by block 535, logs may be examined. For example, logs maintained by an operating system may indicate execution of $3^{rd}$ party applications. Accordingly, based on examination of logs a system and method according to embodiments of the invention may determine whether or not $3^{rd}$ applications are running on a device and thus determine whether or not the device is running in safe mode.

As shown by block 540, an embodiment may determine whether or not a device is in safe mode and, if the device is in safe mode then, as shown by block 520, safe mode may be determined and reported. As shown by block 545, an embodiment may determine the device is not in safe mode and may report failure to enter the device into safe mode.

Since in in some embodiments, when in safe mode there can be no 3rd party applications running on a device unless such $3^{rd}$ party application have specific privileges, and since a user cannot activate a 3rd party application in safe mode, a system and method according to embodiments of the invention may test a functionality by using an external device that may call or invoke a specific functionality of an operating system.

A system and method according to embodiments of the invention may activate an application on a tested device running in safe mode using a call to the operating system on the tested device. A system and method according to embodiments of the invention may use a special application, e.g., one with privileges enabling it to run in safe mode, e.g., diagnostic application 150.

Figure 6:
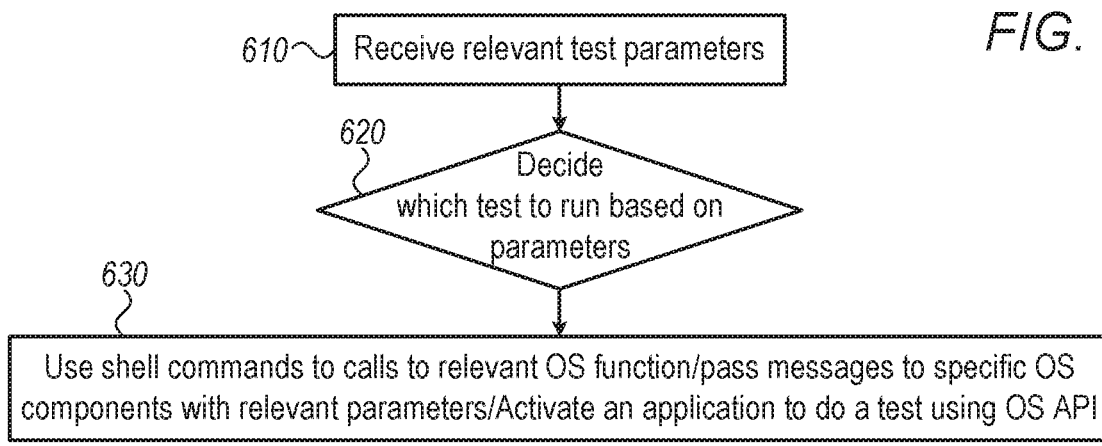
FIG. 6 shows a flowcharts of a method for diagnosing a computing device according to some embodiment of the present invention.

Reference is made to FIG. 6, a flowchart of a method according to an embodiment of the present invention. As shown by block 610, relevant test parameters may be received. For example, test parameters may include: an indication of a test to perform by using a specific identification (ID) with a combination of other parameters such as phone number to call; a uniform resource locator (URL) usable for getting test parameters or other data; number or pictures to take when testing a camera, number of seconds to run a video test, etc. For example, test parameters may be obtained from a knowledge base or database as described. For example, the type or kind of tests to run for specific $3^{rd}$ party applications may be stored in a server and diagnostic application 150 may get from the server the specific parameters needed for testing $3^{rd}$ party applications it identified on a tested device. For example, diagnostic application 150 may download from a serve only, selectively or specifically, the tests for $3^{rd}$ party applications it discovered on a tested device.

As shown by block 620, an embodiment may use information collected as describe in order to determine or select tests to be performed. For example, based on the $3^{rd}$ applications found on a device, diagnostic application 150 may select tests, e.g., tests that are known to be relevant to the $3^{rd}$ applications found. In some embodiments, the list of $3^{rd}$ applications found on a device may be sent to a server and the server may respond with a list of tests to be performed based on the list of $3^{rd}$ applications received by the server.

As shown by block 630, the test to be executed may be selected based on the relevant test parameters. As further shown, shell commands or AT commands may be used to call to relevant operating system's functions and to pass messages to specific operating system's components with relevant parameters in order to initiate or run a test while the tested device is running in safe mode. Other methods may include using API's that directly interact with, or call functions of, an operating system in the tested device.

If a test in safe mode was successful, e.g., no failures were detected during performance of the specific test when the device is in safe mode but the test failed when in normal mode or any mode other than safe mode, then a system and method according to embodiments of the invention may identify, determine or isolate the cause of failure. For example, as the $3^{rd}$ party application or service causing the test to fail may be identified or determined. For example, a system and method according to embodiments of the invention may filter the relevant applications using one or more rules and may activate one application, service or component one at a time in order to isolate the cause of failure.

Figure 7:
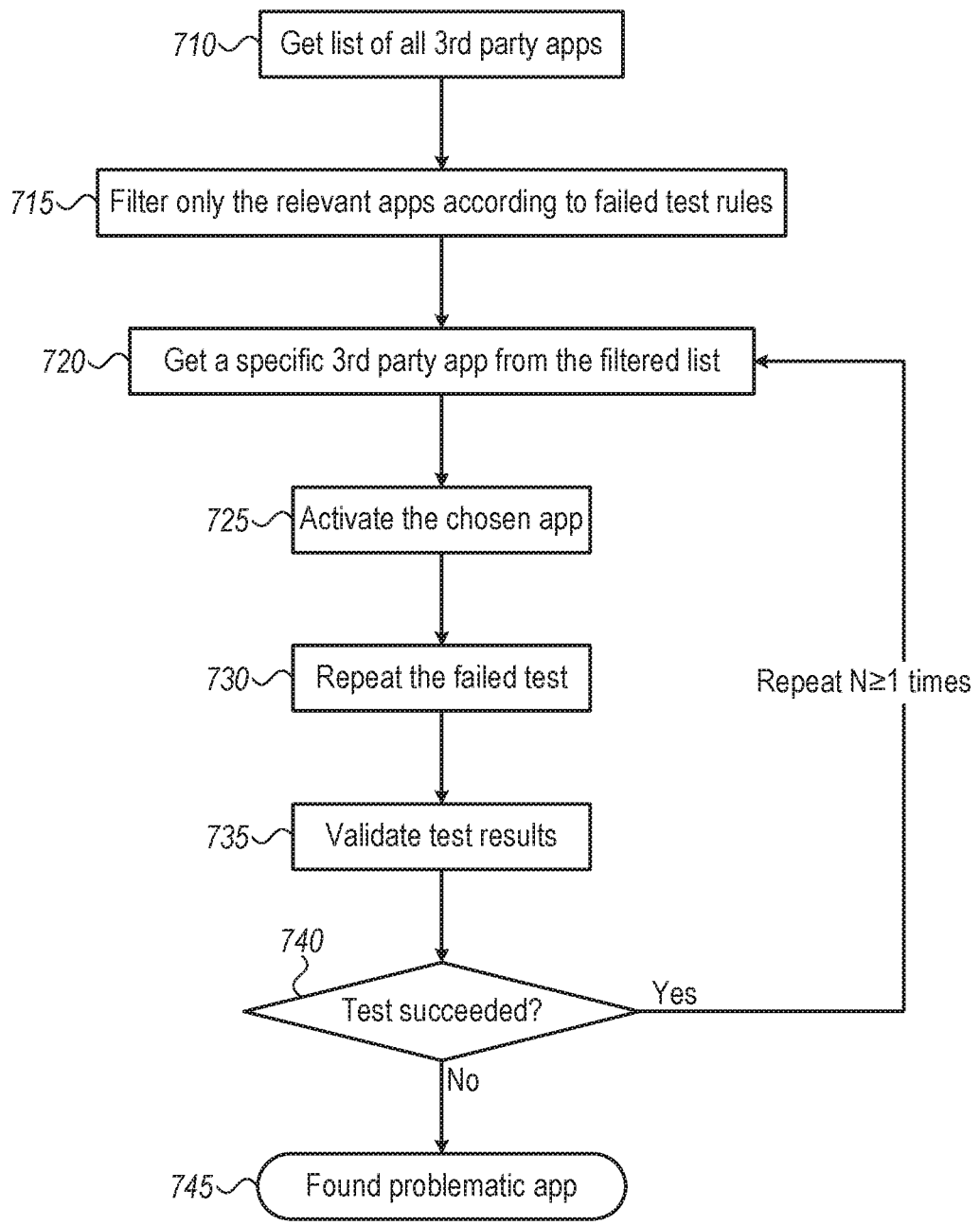
FIG. 7 shows a flowcharts of a method for diagnosing a computing device according to some embodiment of the present invention.

Reference is made to FIG. 7, a flowchart of a method according to some embodiments of the present invention. As shown by block 710, a list of all $3^{rd}$ party applications and services installed, executed or present on a tested device may be obtained. For example, by examining storage 130 and identifying $3^{rd}$ party applications (e.g., $3^{rd}$ party applications such as $3^{rd}$ party application 125) stored thereon, a system and method according to embodiments of the invention may compile a list of all $3^{rd}$ party applications installed on computing device 100.

As shown by block 715, rules may be used in order to filter or identify only the relevant $3^{rd}$ party applications and/or in order to selectively execute applications as described. As described, a test may include activating a selected application and accessing or using resources while the application is executing. Selecting an application and/or resources for a test may be based on rules. For example, a rule for selecting an application for a test may include, or be related to, a name of an application, or a portion of a name, e.g., a rule may be selecting applications that have "sound" in their names and therefor, applications named "BestSound" and "YourSound" may be selected for the test by diagnostic application 150. Any logic or criteria may be included in rules, e.g., logic or criteria related to applications names, permissions (e.g., select applications with root permission), category, date installed (e.g., select applications installed in the last week), size (e.g., select application larger than 1 MB) and so on. According to some embodiments, rules or types of rules may be related to: applications that belong to specific category (e.g., select only messaging applications and/or only image processing applications and so on); predefined list of applications per component tested (e.g., select only applications that use a specific resource, for example, applications that use the camera); applications with specific permissions (e.g., applications with root permissions as defined or recorded in an application manifest or plist file), and the like.

For example, a rule may define the type of $3^{rd}$ party applications to be tested, the size of $3^{rd}$ party applications to be tested, a hardware component (e.g., only select $3^{rd}$ party applications related to, or that use, a camera, a GPS chip or other hardware component) and so on.

As shown by block 720, a specific $3^{rd}$ party application may be selected, and, as shown by block 725, a selected application may be activated or executed. For example, a system and method according to embodiments of the invention may selectively load one 3$^{rd}$ party application from storage 130 into memory 120 and cause controller 105 to run or execute the selected and loaded 3$^{rd}$ party application. For example, diagnostic application 150 may use a list or rule to iteratively execute a set of 3$^{rd}$ party applications, one at the time and determine whether or not a 3$^{rd}$ party application is causing a problem (e.g., be verifying that resources of the computing device are functioning properly while the selected 3$^{rd}$ party is executing). If diagnostic application 150 determines that a 3$^{rd}$ party application is problematic or causes a problem or malfunction of the computing device then diagnostic application 150 may perform any of the actions as described herein (e.g., uninstall the 3$^{rd}$ party application, modify settings of the computing device, suggest an action to a user and so on). If diagnostic application 150 determines that a 3$^{rd}$ party application being tested causes no issues then diagnostic application 150 may terminate the 3$^{rd}$ party application and select to execute or test another or next 3$^{rd}$ party application, e.g., based on a list of applications to be tested, rule or category as described herein.

Rules and configuration parameters or values used by diagnostic application 150 may be related to the number of application to be executed, together, in a test, and/or to an order or sequence of execution of applications in a test. For example, based on tracking misbehaving 3$^{rd}$ party applications (e.g., when executed on a large number of devices under various circumstances or scenarios) information in a knowledge base (e.g., a server) may indicate that a specific 3$^{rd}$ party application causes problems if executed right after another, different 3$^{rd}$ party application. In other cases, by logging and tracking behavior of 3$^{rd}$ party applications it may be identified that two 3$^{rd}$ party applications typically cause a problem (e.g., halt or freeze a device) if the two 3$^{rd}$ party applications are executed together, concurrently or simultaneously on a smartphone. Accordingly, tests that define sequences or order of execution of applications may be generated (e.g., by a server) and the tests, sequences or orders may be provided to diagnostic application 150 that may execute a test based on such definitions, e.g., diagnostic application 150 may select a predefined set of applications to be executed together, at the same time or diagnostic application 150 may execute, one by one, a number of applications according to a predefined order or sequence.

As shown by block 730, a test (e.g., running a selected application or set of applications) may be repeated a number of times and results may be recorded for each run. As shown by block 735, success or failure of a test (e.g., while or when the selected 3$^{rd}$ party application is running) may be determined. As discussed, determining a test succeeded or failed may be done after execution of an application, e.g., by verifying, after the applications exists or terminates, that the application did not modify settings of the device.

As shown by block 740, an embodiment may determine whether or not a test failed and, as shown by the arrow connecting blocks 740 and 720, if a test related to one application succeeded, an embodiment may select another application for testing, e.g., iteratively test all selected applications or all applications to be tested as defined by a rule or criteria. As shown by block 745, if a test fails then an embodiment may determine that the application involved in the test is causing problems or issues and an embodiment may perform one or more actions based on the identified problematic application. For example, an embodiment may inform a user that his or her device includes an application that causes undesirable issues, suggest, to the user of the tested device, ways to overcome a problem (e.g., uninstall an application, change settings or permissions of an application etc.).

A test may be repeated or performed a number of times, e.g., in order to increase a confidence level of the test results. Running 3$^{rd}$ party applications one at the time and verifying tests as described may enable a system and method according to embodiments of the invention to pin point the 3$^{rd}$ party application that causes a test to fail.

For example, if a test succeeds when, other than an operating system, only a first 3$^{rd}$ party application is running but fails when, other than an operating system, only a second 3$^{rd}$ party application is running then a system and method according to embodiments of the invention may determine that the second 3rd party application is the cause of a problem related to the tested device. For example, a test may include running a selected application and using a resource, e.g., activating a flashlight (using the flash LED of a smartphone's camera). For example, if, when a first 3$^{rd}$ or other application is running (executed on a tested device) the flashlight can be activated but, when a second 3$^{rd}$ or other application is executed, the flashlight cannot be activated then diagnostic application 150 may determine that the second application is problematic as described and may further uninstall and/or report the second application, store information describing the second application and the relevant resource (e.g., flashlight in the current example) such that a knowledge based is updated.

Figure 8:
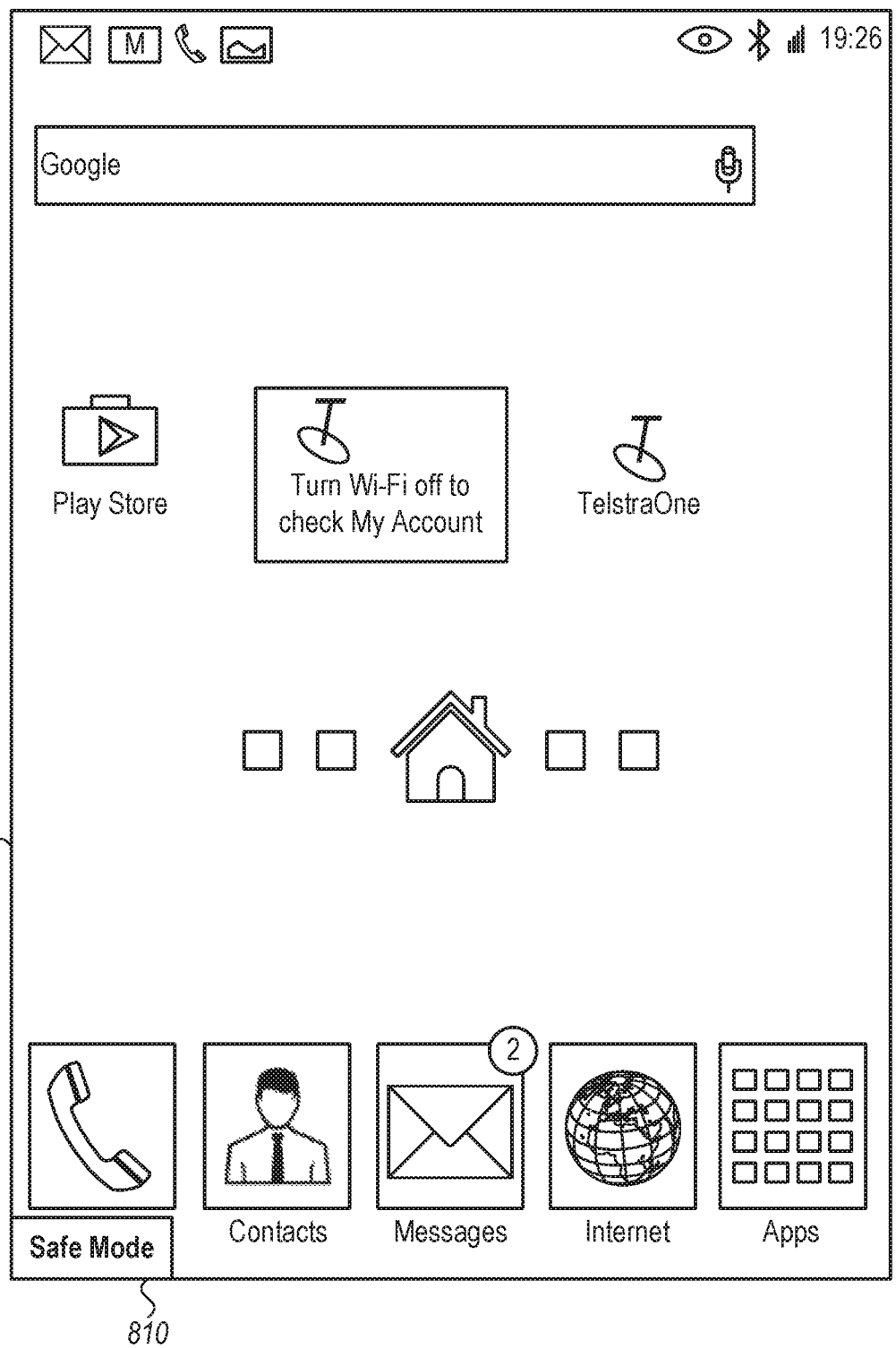
FIG. 8 shows a screenshot of a display of a mobile device according to an embodiment of the present invention.

Reference is made to FIG. 8 that shows a screenshot 800 of a display of a mobile device according to an embodiment of the present invention. As shown by block 810 at the bottom lower corner of screenshot 800, a graphical indication that the device is running in safe mode may be provided, e.g., by diagnostic application 150. Other indications may be provided as known in the art, e.g., using the speakers of the tested device.

Performing a test may include executing a tested application (e.g., a 3$^{rd}$ party application) and testing or validating performance of one or more selected resources. For example, if a first 3$^{rd}$ party application is known to tamper with the sound settings of a device (e.g., based on information in a knowledge base or database as described) then the speakers or sound system or component may be tested while the first 3$^{rd}$ party application is executed and, if a second, different 3$^{rd}$ party application is known to tamper with the network settings of a device then the network unit, system or component may be tested while the second 3$^{rd}$ party application is executed. Any number of selected resources may be accessed or test for each tested application. A knowledge base that indicates which resources should be tested for each application may be generated based on results of tests recorded as described. For example, results that include a name or identifier of an application and/or version, resources disabled by the application and other information may be collected from a large number of devices tested as described herein in order to create a knowledge base.

Selected resources may be tested before, during and after execution of a tested application. For example, a resource (e.g., network chip or unit, speakers, screen etc.) may be tested before executing a tested application (e.g., in order to verify proper operation), may be tested during or while the tested application is executed and/or may be tested after execution of the tested application is terminated. For example, an application may change the network settings of a device when, or just before exiting or terminating, by testing resources after the application exits or terminates, embodiments of the invention may detect such tampering with resources even if not done while the application is running but only upon exiting. Accordingly, a test may determine if an application disables a resource, prevents the resource from providing a service, or otherwise interferes with a resource's operation either during or after the application executes.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of diagnosing a computing device, the method comprising:
   causing the computing device to boot and operate in a normal mode, wherein the normal mode is an operational mode other than a safe mode;
   while operating in the normal mode, launching a diagnostic application installed in the computing device to execute one or more tests;
   executing the one or more tests;
   detecting a test failure by the computing device;
   after detecting the test failure by the diagnostic application installed in the computing device:
      recording state information of the computing device prior to restarting the computing device;
      modifying an operating system of the computing device to cause the computing device to enter the safe mode upon restarting the computing device; and
      restarting the computing device according to the safe mode after recording the state information and modifying the operating system;
   validating that the computer device is operating in safe mode;
   verifying, by the diagnostic application, that, other than the diagnostic application, the only code executed on the computing device is code of the operating system;
   repeating execution of the one or more tests on the computing device while operating in the safe mode;
   recording a result of executing the one or more tests; and
   performing an action based on the result.

2. The method of claim 1, wherein the safe mode includes executing only a portion of an operating system and the diagnostic application.

3. The method of claim 1, comprising recording results of tests executed under normal mode and selecting to execute tests under safe mode based on the recorded results.

4. The method of claim 1, comprising selectively executing an application and identifying a problem caused by the application.

5. The method of claim 1, wherein a test includes executing an application and selectively validating performance of one or more resources while the application is executing and after the application has terminated.

6. The method of claim 1, wherein the diagnostic application is stored in a memory of the computing device by one of: a manufacturer of the computing device and downloading by an operator.

7. The method of claim 1, wherein a test includes executing an application selected based on a rule related to a category of applications.

8. The method of claim 1, wherein a test includes executing an application selected based on a set of applications for which execution failed under normal mode.

9. A computer-implemented method of identifying a source of a failure in a computing device, the method comprising:
   causing the computing device to boot and operate in a normal mode, wherein the normal mode is an operational mode other than a safe mode;
   while operating in the normal mode, launching a diagnostic application installed in the computing device;
   while operating in the normal mode, launching a diagnostic application installed in the computing device to execute one or more tests;
   executing the one or more tests;
   detecting a test failure by the computing device;
   after detection of the test failure by the diagnostic application installed in the computing device:
      record state information of the computing device prior to restarting the computing device;
      modify an operating system of the computing device to cause the computing device to enter the safe mode upon restarting the computing device; and
      restart the computing device according to the safe mode after recording the state information and modifying the operating system;
   validating that the computer device is operating in safe mode;
   verifying, by the diagnostic application, that, other than the diagnostic application, the only code executed on the computing device is code of an operating system;
   repeating execution of the one or more tests on the computing device while operating in the safe mode;
   selectively executing one application from a set of applications;
   recording a result of executing the application; and
   performing an action based on the result.

10. A system comprising:
   a mobile computing device, wherein the mobile computing device is configured to receive a command from an external computing unit, and upon receipt of the command and responsive to the command the mobile computing device performs operations comprising:
      cause the computing device to boot and operate in a normal mode, wherein the normal mode is an operational mode other than a safe mode;
      while operating in the normal mode, launch a diagnostic application installed in the computing device;
      execute the one or more tests;
      detect a test failure by the computing device;
      after detection of the test failure by the diagnostic application installed in the computing device:
         record state information of the computing device prior to restarting the computing device;
         modify an operating system of the computing device to cause the computing device to enter the safe mode upon restarting the computing device; and
         restart the computing device according to the safe mode after recording the state information and modifying the operating system;
      operate in the safe mode;
      validate that the computer device is operating in safe mode;
      verify, by the diagnostic application, that, other than the diagnostic application, the only code executed on the computing device is code of the operating system;

repeat execution of the one or more tests on the computing device while operating in the safe mode;
record a result of executing the one or more tests; and
perform an action based on the result.

11. The system of claim 10, wherein the external computing unit is one of: a remote server and a directly connected computer and wherein the external computing unit is configured to:
cause the computing device to restart into the safe mode; and
cause the diagnostic application installed in the computing device to:
selectively execute one or more tests;
record a result of executing a test; and
perform an action based on the result.

12. A system comprising:
a memory storing executable program code including a diagnostic application; and
a controller coupled to the memory and configured to execute the program code to:
cause the computing device to boot and operate in a normal mode, wherein the normal mode is an operational mode other than a safe mode;
while operating in the normal mode, launch the diagnostic application installed in the computing device to execute one or more tests;
execute the one or more tests;
detect a test failure by the computing device;
after detecting the test failure by the diagnostic application installed in the computing device:
recording state information of the computing device prior to restarting the computing device;
modifying an operating system of the computing device to cause the computing device to enter the safe mode upon restarting the computing device; and
restarting the computing device according to the safe mode after recording the state information and modifying the operating system;
verify, by the diagnostic application, that, other than the diagnostic application, the only code executed on the computing device is code of the operating system;
repeat execution of the one or more tests on the computing device while operating in the safe mode;
record a result of executing the one or more tests;
perform an action based on the result.

13. The system of claim 12, wherein the safe mode includes executing, on the computing device, only a portion of an operating system and the diagnostic application.

14. The system of claim 12, wherein the controller is configured to record results of tests executed under normal mode and select to execute tests under safe mode based on the recorded results.

15. The system of claim 12, wherein the controller is configured to selectively execute an application and identify a problem caused by the application.

16. The system of claim 12, wherein a test includes executing an application and selectively validating performance of one or more resources of the computing device while the application is executing and after the application has terminated.

17. The system of claim 12, wherein the controller is configured to execute a diagnostic application is stored in a memory of the computing device by one of: a manufacturer of the computing device and downloading by an operator.

18. The system of claim 12, wherein the controller is configured to execute a test by executing an application selected based on a rule related to a category of applications.

19. The system of claim 12, wherein a test includes executing an application selected based on a set of applications for which execution failed under normal mode.

* * * * *